United States Patent

Burland

[15] 3,677,451
[45] July 18, 1972

[54] SUPPORTING BAR ASSEMBLY FOR VEHICLE

[72] Inventor: Oliver John Burland, 214 Rugley Road, Western Springs, Ill. 60558

[22] Filed: Dec. 22, 1969

[21] Appl. No.: 886,829

[52] U.S. Cl. .................................................. 224/47.1 F
[51] Int. Cl. ........................................................ B60r 11/00
[58] Field of Search .................... 224/42.1 E, 42.1 F, 42.1 G; 151/41.76, 41.71

[56] References Cited

UNITED STATES PATENTS

| | | | |
|---|---|---|---|
| 3,281,030 | 10/1966 | Gosswiller | 224/42.1 |
| 1,633,295 | 6/1927 | Sutherland et al. | 85/32 |
| 2,480,353 | 8/1949 | Bjork | 224/42.1 |
| 2,643,040 | 6/1953 | Hare | 224/42.1 |
| 3,339,953 | 9/1967 | Bohn | 151/41.76 |

*Primary Examiner*—Gerald M. Forlenza
*Assistant Examiner*—Lawrence J. Oresky
*Attorney*—Dawson, Tilton, Fallon & Lungmus

[57] ABSTRACT

A supporting bar structure for a vehicle includes an elongated bar and a pair of end brackets for securing the bar above the vehicle roof. The bar includes substantially planar top and bottom surfaces, and at least one longitudinally extending T-shaped slot is provided in each of the surfaces. A pair of T-fittings is slidably received by the bottom slot, and a bracket is adjustably secured adjacent each end of the bar by a bolt extending through the bracket into one of the T-fittings to tighten the T-fitting and the bracket against the bottom wall of the bar. The brackets are equipped with clamping means for anchoring the bar to the vehicle. T-fittings can be received by the slot in the upper surface of the bar for securing vehicle warning lights, sirens, and the like to the support bar.

4 Claims, 10 Drawing Figures

Patented July 18, 1972

INVENTOR:
OLIVER J. BURLAND
BY
Dawson, Tilton, Fallon & Lungmus
ATT'YS

Patented July 18, 1972
3,677,451
3 Sheets-Sheet 2
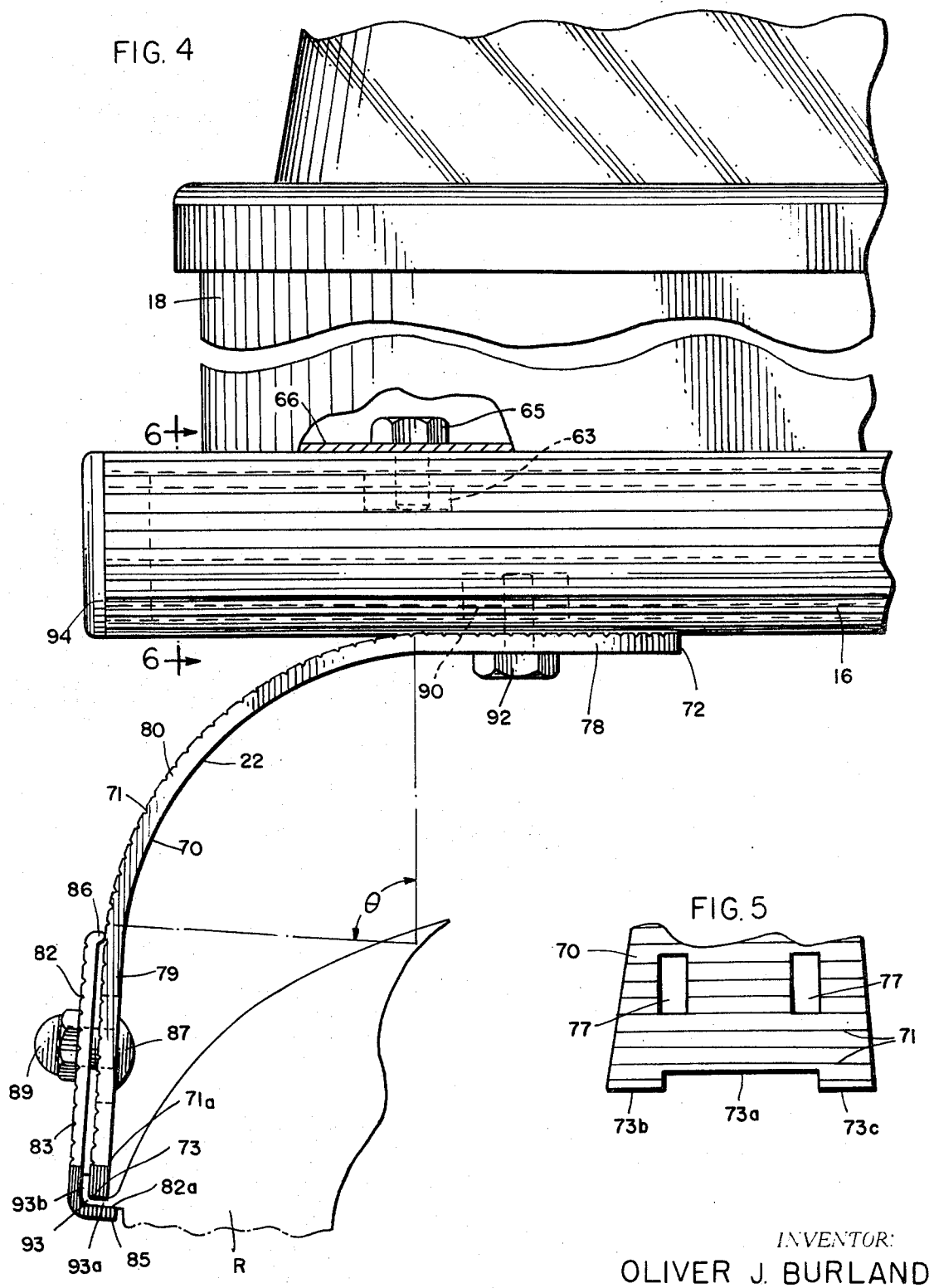
INVENTOR:
OLIVER J. BURLAND
BY
Dawson, Tilton, Falloy & Lungmus
ATT'YS Patented July 18, 1972
3,677,451
3 Sheets-Sheet 3
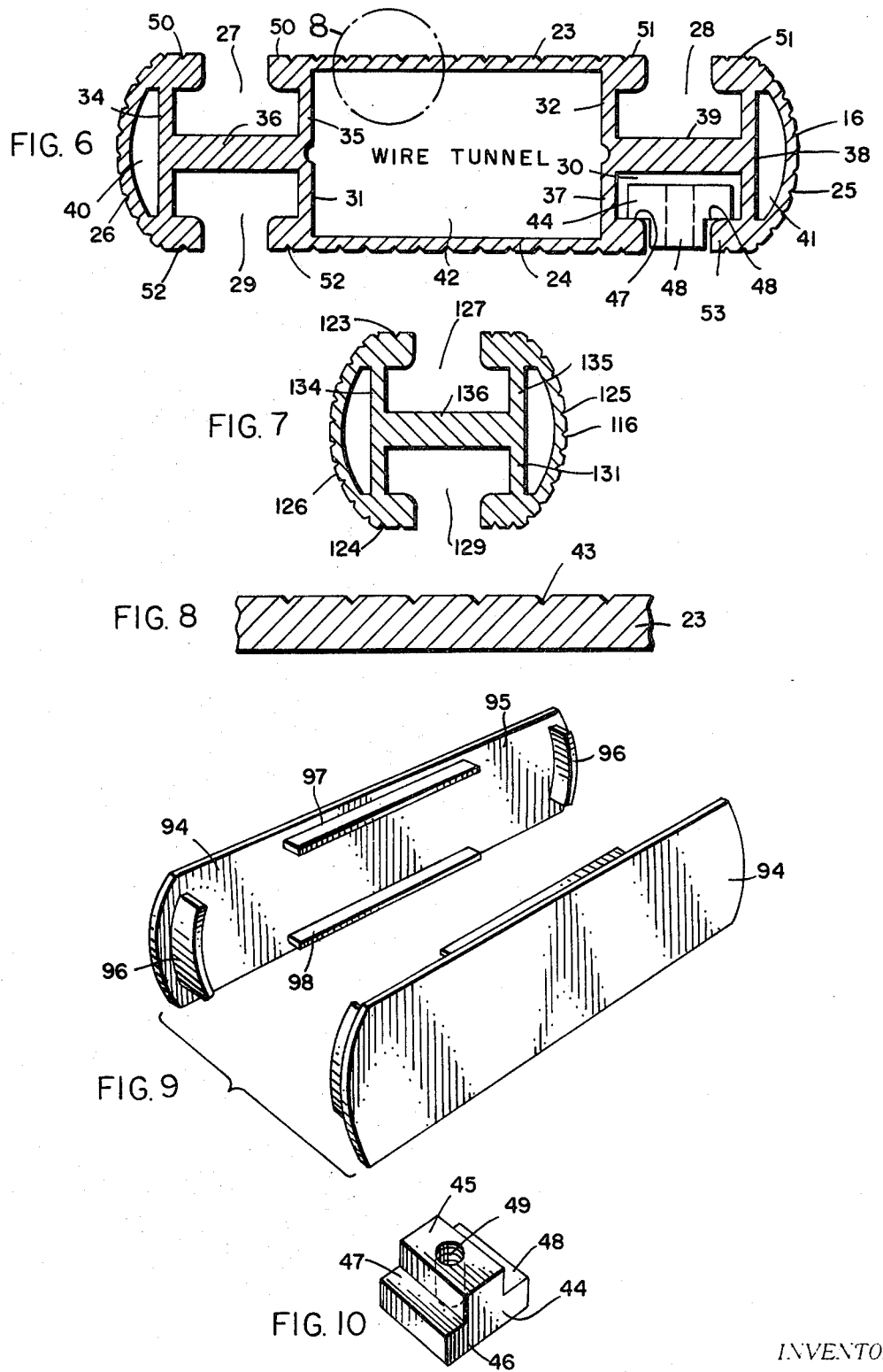
INVENTOR:
OLIVER J. BURLAND
BY
Dawson, Tilton, Fallon & Lungmus
ATT'YS

SUPPORTING BAR ASSEMBLY FOR VEHICLE

BACKGROUND

This invention relates to a supporting bar structure for a vehicle, and, more particularly, to a supporting bar structure particularly suitable for mounting vehicle warning devices such as signal lights and sirens to emergency vehicles.

In the past, vehicle warning devices have generally been mounted on vehicles by securing the device directly to the roof of the vehicle. However, it is desirable to provide mounting means for these signal devices for detachably securing the device to the vehicle. For example, an emergency vehicle such as a police car on which the signal device is detachably mounted can readily be converted to an unmarked patrol car. Further, if the vehicle becomes damaged or its useful life has ended, it is desirable to remove the signal device so that is may continue to be used and to prevent the signal device from being improperly used by a future owner of the vehicle.

SUMMARY

The invention provides a supporting bar structure which permits signal devices to be readily mounted on a variety of vehicles. The supporting bar is adapted for use with a number of different signal devices, and several signal devices can be firmly but removably secured to the support bar at desired locations therealong. The bar and the signal devices carried thereby are firmly anchored against movement in any direction, and the support bar may be secured without damaging or marring the vehicle. When it is desired to remove the signal devices, the supporting bar can be readily detached from the vehicle.

DESCRIPTION OF THE DRAWINGS

The invention will be explained in conjunction with an illustrative embodiment shown in the accompanying drawings, in which

FIG. 4 is a fragmentary front elevational view showing the left-hand portion of the support bar as viewed in FIG. 1;

FIG. 5 is a fragmentary side elevational view of one of the brackets;

FIG. 6 is a sectional view taken along the lines 6—6 of FIG. 4;

FIG. 7 is a sectional view similar to FIG. 6 but of the support bar illustrated in FIG. 3;

FIG. 8 is an enlarged fragmentary view of a portion of FIG. 6 designated by the circle 8;

FIG. 9 is a perspective view of the end caps for the support bar; and

FIG. 10 is a perspective view of one of the T-fittings.

DESCRIPTION OF SPECIFIC EMBODIMENTS

Figure 1:
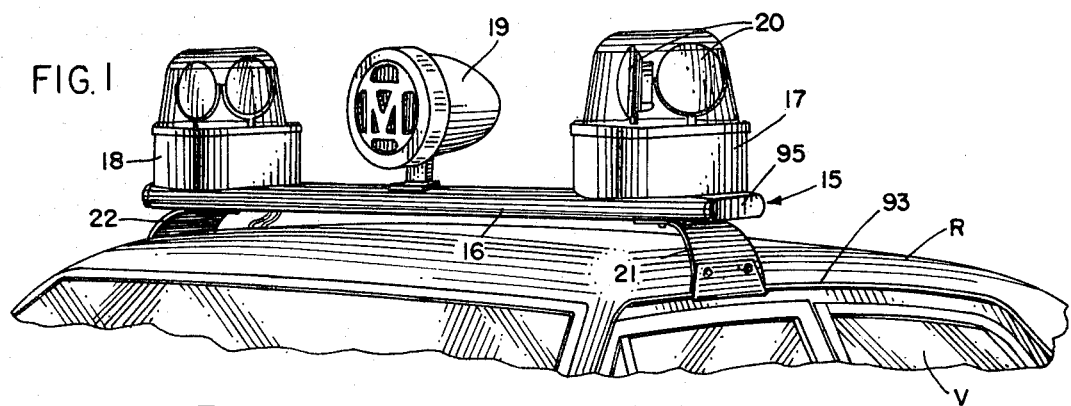
- FIG. 1 is a perspective view of the support bar assembly attached to the roof of a vehicle.

Referring now to FIG. 1, the numeral 15 designates generally a supporting bar assembly for supporting emergency signal devices and the like to a vehicle V having roof R. The support bar assembly 15 includes an elongated support bar 16 which carries a pair of warning light housings 17 and 18 adjacent each end thereof and a siren 19 intermediate the light housings. The light housings may be provided with suitable emergency warning lights 20 which may reciprocate or rotate within the housing. A pair of mounting brackets 21 and 22 adjacent the ends of the support bar detachably secure the support bar to the vehicle.

Referring now to FIG. 6, the support bar 16 is seen to be symmetrical about a vertical plane through the longitudinal centerline and includes generally planar, parallel top and bottom walls 23 and 24, respectively, and a pair of curved side walls 25 and 26. A pair of longitudinally extending slots 27 and 28 are provided in the top wall 23 throughout the length thereof, and longitudinally extending slots 29 and 30 which are generally vertically aligned, respectively, with the slots 27 and 28 provided in the bottom wall 24. The top and bottom walls are joined by a pair of longitudinally extending connecting portions 31 and 32 which are generally H-shaped in transverse cross-section. The connection portion 31 includes generally vertically extending side walls 33 and 34 spaced laterally from the edges of the slots 27 and 29 and a cross wall 36 which provides the slots 27 and 29 with a generally T-shaped transverse cross-section. Similarly, connecting portion 32 includes side walls 37 and 38 and cross wall 39 to provide the slots 28 and 30 with T-shaped cross-sections. Each of the vertical walls 34 and 38 is spaced from the adjacent side wall 25 or 26 to provide longitudinally extending passages 40 and 41, and the central portion of the support bar is provided with a longitudinally extending through-passage or tunnel 42 defined by the top and bottom walls 23 and 24 and the vertical walls 35 and 37. As can be seen best in FIG. 7, the outer surfaces of the top, bottom and side walls of the support bar are provided with longitudinally extending generally V-shaped serrations or grooves 43.

Each of the T-shaped slots of the support bar is adapted to slidably receive a generally T-shaped nut fitting 44 (FIG. 10), each of which includes a central portion 45 and a cross portion 46 extending generally perpendicular to the central portion and providing a pair of shoulders 47 and 48. An internally threaded bore 49 is provided centrally of the central portion 45. The T fittings can be slidably received by each of the slots 27–30, and the fittings are sized so that the central portion 46 extends between the edges of the slot and the shoulders 47 and 48 are engageable with the inner surfaces of the top or bottom wall 23 or 24. Referring again to FIG. 6, the portions 50 and 51 of the top wall 23 which extend laterally of the H-shaped connecting portions 31 and 32, respectively, are seen to be reinforced or enthickened compared to the remainder of the top wall and the lower surfaces thereof provide relatively rigid retention shoulders for the T-fittings. Similarly, the bottom wall 24 includes reinforced shoulder-providing portions 52 and 53. The vertical extent or height of the central portion 45 of the T-fittings is slightly less than the thickness of these reinforced portions of the top and bottom walls so that the top of the central portion will not extend beyond the top surface of either the top or bottom wall when the shoulders of the T-fitting engage the inner surface of the wall.

Figure 2:
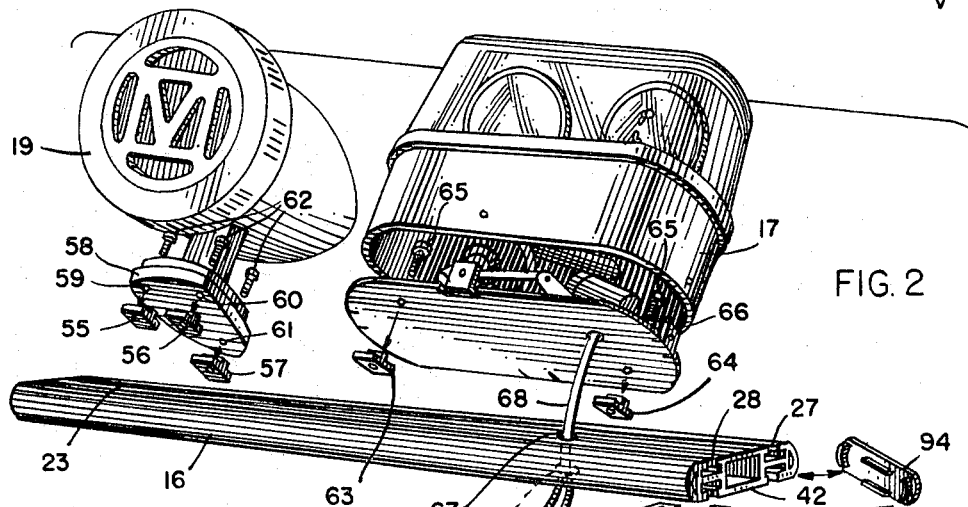
FIG. 2 is an exploded perspective view of one end of the support bar assembly.

Referring to FIG. 2, T-fittings 55 and 56 are received by the slot 28 in the top wall of the support bar, and T-fitting 57 is received in the slot 27, and the fittings are moved to approximately the middle of the support bar. The siren 19 includes a base plate 58 provided with aligned bolt openings 59 and 60 and bolt opening 61 spaced from the openings 59 and 60 a distance approximately the same as the spacing of the slots 27 and 28. The siren is secured at the desired position along the support bar by bolts 62 which extend through the openings 59–61 of the base plate and are threadedly received by the threaded openings in the T-fittings. Since the height of the central portion of each T-fitting is less than the thickness of the retaining shoulders provided by the top wall 23, as the bolts are tightened the shoulders 50 and 51 of each of the fittings are drawn against the inner surface of the top wall and the base plate 58 of the siren is drawn against the outer surface of the top wall to securely anchor the siren in the desired location. The T-fittings and base plate are firmly clamped against the top wall, and the siren is secured against both fore and aft and transverse movement with respect to the vehicle.

Signal light housing 17 is similarly secured adjacent one end of the support bar by T-fittings 63 and 64, which are inserted into slots 28 and 27, respectively. Bolts 65 are inserted through suitable openings in base plate 66 of the light housing and are screwed into the threaded openings of the T fittings until the base plate is clamped securely to the top wall of the support bar. Light housing 18 is similarly clamped to the support bar at the desired position adjacent to the other end of the bar.

The central portion of the top wall may be provided with an opening 67 through which electrical wiring 68 for the signal light motor and the lights 20 carried by the light housing 17 can be inserted, and similar openings may be provided for the wires (not shown) for the siren 19 and light housing 18. These wires may extend through the central tunnel 42 of the support bar and withdrawn through an opening 69 provided in the bottom wall 24 adjacent one end of the support bar. The wires can enter the interior of the vehicle through the front window adjacent the opening 69 to be connected to the electrical system of the vehicle or other suitable power source.

Referring to FIGS. 2, 4 and 5, each of the bracket assemblies 21 and 22 includes a generally trapezoidally shaped curved bracket plate 70 having an outer surface provided with serrations or grooves 71 similar to the serrations 43 of the support bar 16 (FIG. 7). Each bracket plate 70 includes a narrow top edge 72, a wide bottom or base edge 73 extending generally parallel to edge 72 and a pair of inclined side edges 74 and 75. The bottom edge 73 includes a notched central portion 73a which provides a pair of depending legs 73b and 73c. A pair of bolt openings 76 are provided through the bracket adjacent the top edge thereof and are spaced apart approximately the distance between the support bar slots 29 and 30, and a pair of generally rectangular openings 77 are provided adjacent the base 73 of the bracket. The bracket plate 71 includes a relatively planar portion 78 adjacent the top edge 72 and a relatively planar portion 79 adjacent the bottom edge 73 which are joined by a curved portion 80 which may curve along an arc θ of about 80° to about 90°.

A clamping plate 82 is engageable with the lower planar portion 79 of the bracket plate and includes a generally planar central portion 83 provided with an outer serrated surface, a bottom flange 84 extending generally perpendicularly from the planar portion 83 toward the bracket plate, and an upper hooked edge 86 which curves away from the central portion 83.

The clamping plate may be secured to the bracket by bolts 87 which include a square shank 88 adjacent the head which is sized to be received by the rectangular slots 77 of the bracket to prevent rotation of the bolt. The bolts 86 extend through the opening 77 and 84 and threadedly engage cap nuts 89.

Each bracket plate 70 may be secured to the support bar adjacent an end thereof by inserting T-fittings 90 and 91 into the slots 29 and 20 and clamping the T-fittings and upper planar portion 78 of the bracket to the bottom wall 24 of the support bar by bolts 92. The flat upper portion 78 of the bracket engages the flat bottom wall 24 of the support bar and provides a substantial bearing surface therebetween. Since the T-fittings 90 and 91 are slidable along the slots 29 and 30 until the bolts 92 are tightened, the position of the brackets can readily be adjusted to fit vehicle roofs of varying widths. The positions of the brackets are adjusted until the bottom edge 73 of each bracket is received by the usual rain trough 93 on each side of the vehicle roof above the doors. The clamping bracket 82 is then positioned so that the bottom flange 85 underlaps the rain trough 93, and the cap nuts 89 are tightened on the bolts 87 while the clamping flange 85 is pulled upwardly against the bottom wall 93a of the rain trough to clamp the side wall 93b of the rain trough tightly between the clamping plate 82 and the lower planar portion 79 of the bracket plate. The bolts 87 may slide upwardly within the rectangular openings 77 to permit the end flange of the clamping plate to be pulled tightly against the trough, and the bottom wall 93a is firmly clamped between the end flange and the depending legs 73b and 73c. The base 73 of each bracket plate is preferably wider than the support bar 16 to provide a stable support therefor, and the support bar and the signal devices mounted thereon are securely anchored against both vertical movement and horizontal movement either transversely or fore and aft with respect to the vehicle.

The bracket assemblies engage the roof of the vehicle only at the rain trough, and the roof of the vehicle will not be scratched or damaged in any way. The possibility that even the rain trough will be scratched can be substantially reduced or eliminated by providing the surfaces of the bracket and clamping plate which engage the rain trough with a thin elastic, resilient coating 71a and 82a, respectively. These coatings can be provided by dipping the parts in a fluid, hardenable material such as liquid rubber, neoprene, or the like. Alternatively, rubber channels or similar protective coverings can be positioned over the bracket base 73 and end flange 85.

After the various T-fittings are positioned longitudinally along the support bar, the ends of the bar may be closed by end caps 94 (FIGS. 2 and 9). Each end cap, which can advantageously be made of molded plastic, has a contour generally identical to the contour of the transverse cross-sectional configuration of the support bar and includes a planar body 95, a pair of inwardly extending curved end flanges 96, and a pair of upper and lower central flanges 97 and 98, respectively. The distance between the top surface of upper flange 97 and the bottom surface of the lower flange 98 is approximately the same as the distance between the inner surfaces of the top and bottom walls 23 and 24 so that flanges 97 and 98 are relatively snugly received in the central opening 42 of the support bar and frictionally engage the top and bottom walls. Similarly, the curved end flanges 96 are sized and arranged to be received relatively snugly by the end openings 40 and 41 of the support bar and frictionally engage the inner curved surfaces of the side walls 25 and 26. The end caps not only provide an aesthetically pleasing appearance to the support bar but serve to prevent rain and debris from entering the openings in the bar.

The support bar 16, bracket plates 70, and clamping plates 82 are advantageously formed of aluminum, and the serrated outer surfaces thereof increase the durability and enhance the appearance of these components by substantially reducing the possibility that scratches or the like will detract from the appearance of the support bar assembly. The serrations 71 of the bracket plates serve a dual function in that as the clamping plate is tightened against the bracket plate, the upper hooked edge 86 of the clamp may be received by one of the serrations, thereby being firmly secured against vertical movement. If the thickness of the bottom wall 93a of the rain trough is such that the hooked edge 86 engages the serrated surface between serrations, the serration below the hooked edge provides a safety feature in that if the cap nut 89 becomes loose enough to permit a sliding movement of the clamping plate relative to the support bracket, the adjacent serration would provide an abutment for preventing excessive sliding movement. If desired, the serrations on the upper surface of the support bar can also be used to cooperate with suitable detents provided on the base plates of the signal devices to provide further anchoring of the signal devices against movement in the fore and aft direction.

The support bar 16 can be extruded, and in one specific embodiment, the transverse dimension of the slots 27–30 between the vertical walls of the connecting portions was 1.00 inch, the mouth of each slot between the retaining shoulders provided by the top and bottom walls was 0.531 inch, the distance from the bottom of the slot provided by the cross portion 36 and the retaining shoulder was 0.312 inch, and the retaining shoulders were 0.250 inch thick. The corresponding dimensions of the T-fittings were such that each T-fitting could readily slide within the slots, and the central portion 45 of each T-fitting extended into the mouth portion of the slot when supported by the cross portion 36 to maintain the T-fitting centered within the slot and to permit the central portion 45 of the fitting to be grasped through the slot in any position therealong by the fingers of one hand. For the foregoing support bar dimensions, one specific embodiment of the T-fitting had a width between the ends of the shoulders 47 and 48 of 0.875 inch, the shoulders had a thickness of 0.250 inch, and the central portion 45 extended 0.240 inch above the shoulders and had a transverse width of 0.500 inch.

The planar end portions 78 and 79 of the bracket plates were about 2 inches long, and the central portion 80 curved along a radius of about 2.69 inches through an angle of about 86°. The clamping brackets had a height between the end flanges 85 and 86 of about 2.38 inches, and the central portion 83 and end flange 85 formed an included angle of about 85°.

The central portion of the top and bottom walls of the support bar between the slots was about 3 inches wide to provide a substantial bearing surface for the base plates of the signal devices and the support brackets. The length of the support bar for use with automobiles can be about 4 ½ feet, and for trucks about 5 feet. The extruded, substantially hollow aluminum support bar provides a light but extremely rigid structure which has a weight of about 2 pounds per longitudinal foot.

Figure 3:
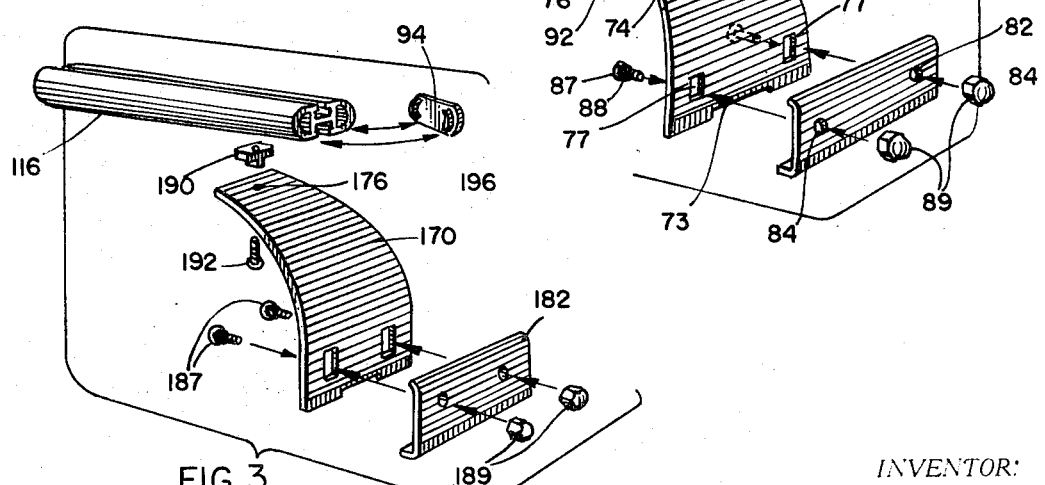
FIG. 3 is a view similar to FIG. 2 showing an alternate embodiment of the invention.

Another embodiment of the support bar assembly is shown in FIGS. 3 and 7. Support bar 116 is narrower in transverse cross-section and includes only a single elongated T-shaped slot 127 and 129 in the top wall 123 and bottom wall 124, respectively. The support bar 116 similarly includes curved side walls 125 and 126 and a generally H-shaped connecting portion 131 having vertical walls 134 and 135 and cross portion 136 which define the T-shaped slots.

A bracket plate 170 having a shape similar to, but somewhat narrower than, the bracket plate 70 is secured adjacent the end of the support bar 116 by T fitting 190 and bolt 192 which extends through opening 176 provided in the flat upper portion of the bracket plate. Clamping plate 182 is similarly secured to the lower flat portion of bracket plate 170 by bolts 187 and cap nuts 189. The ends of the support bar 116 may be closed by end caps 195 provided with curved side flanges 196 which frictionally engage the inner curved surfaces of the side walls 125 and 126 of the support bar.

The support bar 116 may be used to support signal devices as hereinbefore described, and this support bar is particularly suitable for use as a luggage rack. A pair of the support bars 116 may be secured to the vehicle at fore and aft locations, and suitable hooks or anchors for use in tying the luggage can be secured to the support bar by providing the anchors with threaded ends or stud portions for engagement with T-fittings in the upper slot 127. The bar 116 is slightly less than half as wide as bar 16 and weighs about one half as much. In other respects the dimensions of the bars are similar.

The support bars 16 and 116 can be readily removed from the vehicle when desired merely by loosening the cap nuts which hold the clamping plate against the bracket plate to permit the end flange 85 of the clamping plate to be moved outwardly and lifted away from the rain trough.

While in the foregoing specification, a detailed description of specific embodiments of the invention was set forth for the purpose of illustration, it is to be understood that many of the details herein given may be varied considerably by those skilled in the art without departing from the spirit and scope of the invention.

I claim:

1. A support bar assembly for a vehicle comprising an elongated bar having substantially planar top and bottom walls, each wall having a longitudinally extending slot to provide the wall with an inner surface and an outer surface, a pair of generally T-shaped fittings slidably received in each slot, each fitting including shoulder means extending transversely of the associated slot and engageable with the inner surface of the associated wall for preventing withdrawal of the fitting from the slot, a bracket for each end of the bar equipped with clamping means for securing the bar to a vehicle, and bolt means for each bracket, each bolt means extending through an opening provided in the bracket and being threadedly received by one of the fittings in the bottom wall slot to draw the shoulder means of the fitting into engagement with the inner surface of the bottom wall and to draw the bracket into engagement with the outer surface of the bottom wall, each of the brackets comprising a generally trapezoidally shaped curved bracket plate provided with a wide bottom and a narrow top, each bracket plate being provided with a plurality of spaced-apart grooves and the bottom of each bracket plate being wider than the transverse dimension of the bar and being adapted to be received by a rain trough of the vehicle, each of the clamping means including a clamping plate having a generally planar central portion and a bottom flange adapted to extend in underlapping relation to the rain trough, the clamping plate including means engageable with one of the grooves of the associated bracket plate to restrain relative sliding movement of the clamping plate with respect to the bracket plate, and means for securing the clamping plate to the bracket plate.

2. A support bar assembly for a vehicle comprising an elongated bar having substantially planar top and bottom walls, each wall having an inner surface and an outer surface and having a pair of longitudinally extending slots therethrough, each of the slots in the top wall being generally aligned with a slot in the bottom wall, the top and bottom walls being joined by connecting portions having generally H-shaped transverse cross-sections to provide each slot with a generally T-shape, a T fitting slidably received in each slot, each fitting including a pair of shoulders extending transversely of the associated slot and engageable with the inner surface of the associated wall for preventing withdrawal of the fitting from the slot, a bracket for each end of the bar equipped with clamping means for securing the bar to a vehicle, and a bolt for each bracket, each bolt extending through an opening provided in the bracket and being threadedly received by one of the fittings in the bottom wall slot to draw the shoulders of the fitting into engagement with the inner surface of the bottom wall and to draw the bracket into engagement with the outer surface of the bottom wall, each of said brackets comprising a generally trapezoidally shaped curved bracket plate provided with a wide bottom and a narrow top, the bottom of each bracket plate being wider than the transverse dimension of the bar and being adapted to be received by a rain trough of the vehicle each bracket including generally planar end portions adjacent the top and bottom thereof and a curved central portion and being provided with a plurality of spaced-apart grooves on one surface thereof, each of the clamping means including a clamping plate having a generally planar central portion, a bottom flange adapted to extend in underlapping relation to the rain trough and hook means engageable with one of the grooves to restrain relative sliding movement of the clamping plate with respect to the bracket plate, and bolt means for securing the clamping plate to the bracket plate whereby the rain trough may be clamped therebetween.

3. A support bar assembly for a vehicle comprising an elongated bar having substantially planar top and bottom walls, each wall having an inner surface and an outer surface and having a pair of longitudinally extending slots therethrough, each of the slots in the top wall being generally aligned with a slot in the bottom wall, the top and bottom walls being joined by spaced-apart connecting portions having generally H-shaped transverse cross-sections to provide each slot with a generally T-shape, the bar being provided with a longitudinally extending central passage between the spaced-apart H-shaped connecting portions, a T-fitting slidably received in each slot, each fitting including a pair of shoulders extending transversely of the associated slot an engageable with the inner surface of the associated wall for preventing withdrawal of the fitting from the slot, a bracket for each end of the bar equipped with clamping means for securing the bar to a vehicle, and a bolt for each bracket, each bolt extending through an opening provided in the bracket and being threadedly received by one of the fittings in the bottom wall slot to draw the shoulders of the fitting into engagement with the inner surface of the bottom wall and to draw the bracket into engagement with the outer surface of the bottom wall.

4. A support bar assembly for a vehicle for mounting a warning device comprising an elongated bar having substantially planar top and bottom walls, each wall having an inner surface and an outer surface and having a slot extending longitudinally for the entire length of the bar, the slots being generally vertically aligned, a cross wall having top and bottom surfaces extending generally parallel to the top and bottom walls and separating the slots therein to provide each slot with a generally T-shaped transverse cross section, a pair of fittings slidably received in the slot in the bottom wall and at least one fitting slidably received in the slot in the top wall, each fitting including a pair of shoulders extending transversely of the associated slot and engageable with the inner surface of the associated wall for preventing withdrawal of the fitting from the slot, a bracket for each end of the bar equipped with clamping means for securing the bar to a vehicle, and a bolt for each bracket, each bolt extending through an opening provided in the bracket and being threadedly received by one of the fittings in the bottom wall slot to draw the shoulders of the fitting into engagement with the inner surface of the bottom wall and to draw the bracket into engagement with the outer surface of the bottom wall, the fitting in the top wall slot being adapted to threadedly receive a bolt on the warning device whereby the shoulders of the fitting may be drawn into engagement with the inner surface of the top wall and the warning device may be drawn into engagement with the outer surface of the top wall, the cross wall supporting the fitting in the top wall slot when the fitting is not engaged by the bolt on the warning device.

* * * * *